(12) United States Patent  (10) Patent No.: US 8,533,582 B2
Rao et al.  (45) Date of Patent: Sep. 10, 2013

(54) TRAIL-BASED DATA CONTENT DISCOVERY, ORGANIZATION, AND PROCESSING

(75) Inventors: Venkatesh Guru Rao, Arlington, VA (US); Jesse Silverstein, Rochester, NY (US); James Walter Reid, Brockport, NY (US); David Russell Vandervort, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 363 days.

(21) Appl. No.: 12/408,397

(22) Filed: Mar. 20, 2009

(65) Prior Publication Data

US 2010/0241940 A1   Sep. 23, 2010

(51) Int. Cl.
*G06N 5/02*  (2006.01)
(52) U.S. Cl.
USPC .......................................... 715/206; 715/200
(58) Field of Classification Search
USPC .................. 715/205, 206, 208, 234, 243, 255
See application file for complete search history.

(56) References Cited

U.S. PATENT DOCUMENTS

| 6,049,812 | A | 4/2000 | Bertram et al. | |
|---|---|---|---|---|
| 6,356,898 | B2 | 3/2002 | Cohen et al. | |
| 6,377,983 | B1 | 4/2002 | Cohen et al. | |
| 6,404,446 | B1 * | 6/2002 | Bates et al. | 715/854 |
| 6,691,163 | B1 | 2/2004 | Tufts | |
| 6,877,137 | B1 | 4/2005 | Rivette et al. | |
| 6,990,628 | B1 * | 1/2006 | Palmer et al. | 715/234 |
| 7,159,023 | B2 | 1/2007 | Tufts | |
| 7,228,507 | B2 * | 6/2007 | Good et al. | 715/778 |
| 7,249,315 | B2 * | 7/2007 | Moetteli | 715/234 |
| 2002/0138486 | A1 | 9/2002 | Rishel | |
| 2004/0003351 | A1 * | 1/2004 | Sommerer et al. | 715/517 |
| 2004/0237037 | A1 | 11/2004 | Sweet et al. | |
| 2005/0076000 | A1 | 4/2005 | Sweet et al. | |
| 2005/0188300 | A1 | 8/2005 | Sweet et al. | |
| 2006/0085492 | A1 | 4/2006 | Singh et al. | |
| 2006/0218479 | A1 * | 9/2006 | Torres | 715/500 |

FOREIGN PATENT DOCUMENTS

| EP | 0957437 A2 | 11/1999 |
|---|---|---|
| WO | 99/12109 | 3/1999 |

OTHER PUBLICATIONS

"About StumbleUpon," available from: <http://web.archive.org/web/20081017052434/http://www.stumbleupon.com/aboutus/>, Oct. 17, 2008, pp. 1-4.*
European Search Report and Written Opinion, Jul. 6, 2010.
"Help: Introduction to Semantic MediaWiki", http://semantic-mediawiki.org/wiki/Help:Introduction_to_Semantic_MediaWiki, 3 pages, Aug. 6, 2008.
Jack H. et al., "Wikihow User's Manual: About Wikihow", http://www.wikihow.com/About-wikiHow, 4 pages.

(Continued)

*Primary Examiner* — Kyle Stork
(74) *Attorney, Agent, or Firm* — Hoffmann & Baron, LLP

(57) ABSTRACT

Embodiments described herein include a trail generator for implementing a content trail associated with selected data pages. The trail generator retrieves references to data pages selected from the Internet from storage and generates a content trail for the data pages selected from the Internet. The content trail is generated using the references by organizing the references into a user-defined, ordered sequence in the content trail and interconnecting the reference using user-assigned relationships to define at least one path in the content trail that is navigable by a viewer.

23 Claims, 14 Drawing Sheets

(56) References Cited

OTHER PUBLICATIONS

Hewlett-Packard Development Company, L.P.,"Print Web Pages Efficiently", http://h71036.www7.hp.com/hho/cache/344494-0-0-225-121.html?jumpid=reg_R1002_U, 3 pages.
Pedia Press, "PadiaPress-Home", http://pediapress.com/, 3 pages.
Radar Networks, "Twine Tour", http://www.twine.com/tour, 7 pages.
Digg, Inc., "Digg Tour", http://digg.com/tour/1, 5 pages.
StumbleUpon, "About StumbleUpon", http://www.stumbleupon.com/aboutus, 2 pages.
WordPress, "WordPress", http://wordpress.org/about/features, 2 pages.
Blurb, Inc, "Blurb Book Smart", http://www.blurb.com/learn_more/booksmart, 4 pages.
Bush: Vannevar, "As We May Think," The Atlantic Online, www.theatlantic.com;doc/print/194507/bush, 12 pages, Jul. 1945.
OCLC News Releases, "OCLC's New Web Harvester Captures Web Content to Add to Digital Collections," http://www.oclc.org/news/releases/200829.htm, 2 pages, Jul. 29, 2008.
M. Dontcheva, S.M. Drucker, G. Wade, D. Salesin and M.F. Cohen, "Collecting and Organizing Web Content," Personal Information Management—A SIGIR 2006 Workshop, pp. 44-47.

\* cited by examiner

```
<traildoc application="XXXXX" version="X.X">
    <node type="trail" hash="35a9d239-32dc-102c-8e8b-d85627bf4b38">
        . . .
        <name>New Trail</name>
        <desc> Description </desc>
        . . .
        <source_url>http://XXXXXXX/XXXXXX/trails/?t=6</source_url>
        <source_site>http://XXXXXXX/XXXXXX</source_site>
        <tags/>
        <children>
            <node type="node" hash="522ef09f-32dc-102c-8e8b-d85627bf4b38" comment="">
                <id>7</id>
                <reference_id>256</reference_id>
                <name>Three Leaps of Faith Rule</name>
                . . .
                <source_url>http://XXXXXXXX/XXXX/the-three-leaps-of-faith-rule/?t=6</source_url>
                <source_site>http://XXXXXXXX/XXXX</source_site>
                <tags/>
                <wp_tags/> <wp_categories><category>General</category>
                <category>Thinking</category></wp_categories>
                <children>
                    <node type="reference" hash="58855dc3-32dc-102c-8e8b-d85627bf4b38" default="1"/>
                </children>
            </node>
            <node type="node" hash="58855dc3-32dc-102c-8e8b-d85627bf4b38" comment="">
                <id>8</id>
                <reference_id>289</reference_id>
                <name> Happy First Birthday, Ribbonfarm </name>
                . . .
                <source_url>http:// XXXXXXXX/XXXX/happy-first-birthday-ribbonfarm/?t=6</source_url>
                <source_site>http://XXXXXXXX/XXXX</source_site>
                <tags/>
                . . .
                <children>
                    <node type="reference" hash="5885a470-32dc-102c-8e8b-d85627bf4b38" default="1"/>
                    <node type="reference" hash="5885e3e2-32dc-102c-8e8b-d85627bf4b38"/>
                </children>
            </node>
            . . .
        </node>
    </children>
</node>
</traildoc>
```

FIG. 10

TRAIL-BASED DATA CONTENT DISCOVERY, ORGANIZATION, AND PROCESSING

BACKGROUND

1. Technical Field

The presently disclosed embodiments are directed to generating user-defined ordered sequences of data content collected by a user.

2. Brief Discussion of Related Art

The Internet offers a vast amount of web content, which is typically accessible using a web browser. Users can search for web sites by entering search terms in a search engine, which typically returns a list of web sites having a correlation with the provided search terms. Alternatively, users can enter a uniform resource locator (URL) address into their web browsers to navigate directly to a web page and/or can select a link on a web page to navigate to another web page associated with the link. Web sites visited by a user are typically recorded by the web browser in a browser history, which lists the web sites in the order they have been viewed and/or alphabetically. The browser history is typically specific to each instance of a web browser application based on the web sites visited using the web browser.

In recent years, navigation techniques, such as bread crumbs have been implemented, to provide links to web pages within a website based on where the user currently is in the website's hierarchy. Bread crumbs typically appear horizontally near the top of a web page and provide hyperlinks back to each previous page that the user navigates through in order to get to the current page being viewed by the user.

SUMMARY

According to aspects illustrated herein, there is provided a method for implementing a content trail associated with data pages. The method includes retrieving, from storage, references to data pages selected from the Internet and generating a content trail for the data pages selected from the Internet with a trail generator implemented using one or more computing devices. The content trail is generated using references to the data pages, which are organized into a user-defined, ordered sequence in the content trail and are interconnected by user-assigned relationships to define at least one path in the content trail that is navigable.

According to other aspects illustrated herein, there is provided a computer readable medium storing instructions executable by a computing system including at least one computing device, wherein execution of the instructions implements a method for generating a content trail associated with data pages. The method implemented with the instructions are executed includes retrieving, from storage, references to data pages selected from the Internet and generating a content trail of the data pages selected from the Internet with a trail generator implemented using one or more computing devices. The content trail is generated using references to the data pages, which are organized into a user-defined, ordered sequence in the content trail and are interconnected by user-assigned relationships to define at least one path in the content trail that is navigable.

According to further aspects illustrated herein, there is provided a system for generating a content trail. The system includes a computer system including at least one computing device. The computing system configured with a trail generator to retrieve, from storage, references to data pages selected from the Internet and to generate a content of the data pages selected from the Internet using the references. The references are organized into a user-defined, ordered sequence in the content trail and are interconnected by user-assigned relationships to define at least one path in the content trail that is navigable.

BRIEF DESCRIPTION OF THE DRAWINGS

FIG. 10 illustrates an exemplary underlying data structure implemented to maintain a content trail.

DETAILED DESCRIPTION

Figure 1:
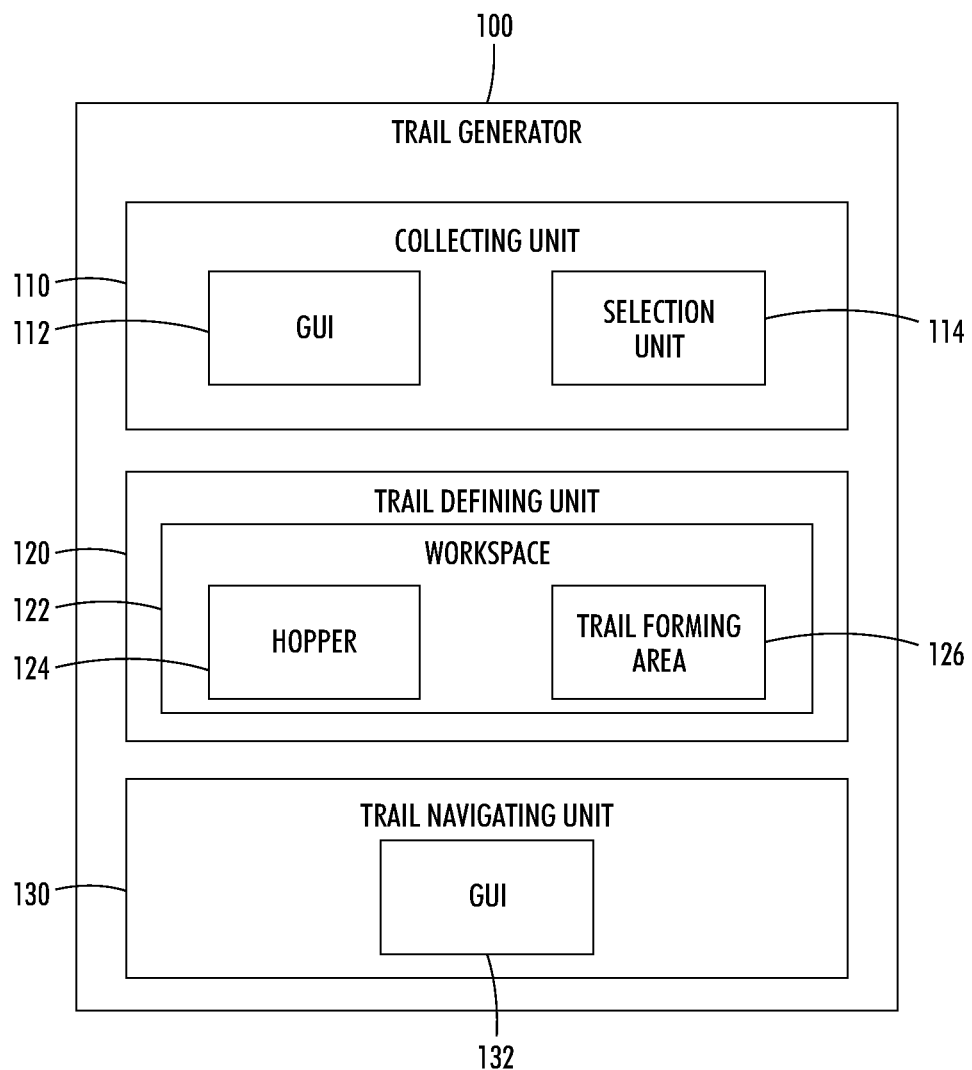
FIG. 1 depicts a block diagram of an exemplary trail generator for collecting data content, defining content trails, and navigating content trail.

Exemplary embodiments include a trail generator for collecting data pages, defining content trails based on the collected data pages, and facilitating navigation of the defined content trails. Users can explicitly collect data pages from the Internet and can store the data pages, or references to the data pages for use in a content trail. A content trail can be defined by arranging the data pages, or references to the data pages, in a partially ordered set and assigning a relationship between the data pages. Such a set includes, but is not limited to, a totally-ordered set, or strict sequence.

In some embodiments, the trial generator can allow individual website owners to create powerful navigation patterns for websites, in flexible ways. As one example, blog owners can use content trails to extend beyond conventional presentations according to chronology, category, and navigation structures, and can individually created ad-hoc relationships between pages.

As another example, multiple website owners can collaborate to create content trails that span multiple sites. In this manner, a website owner can create a content trail that traverses a few articles on the website owner's website, then proceeds to another site for a few additional web pages, before returning to the website owner's website for some concluding articles. Navigation links can be created dynamically from content trail data stored at a single website, distributed across websites, or carried across websites in a temporary, session based variable, in which case a plug-in on a second website can temporarily show navigation controls based on content trail information passed to it from a first website.

As yet another example, users can create their own trails, by collecting data pages using the trail generator and then creating a content trial using the collected data pages. Users can use content trails as the start of print workflows, to create sequenced sets of content for longer print documents. Embodiments of the trail generator can provide a collaborative environment using trails in a variety of ways, to concatenate trails, tag trails, collaborate between trails, copy trails, share trails, and edit trails, print the data pages referenced by the trails, and the like.

Users can create new trails, using techniques such as automated browsing based on heuristics, or expanding a user-defined trail automatically using machine learning algorithms to determine what sorts of content are similar to the content already added by the human users.

Recommendation systems based on content trails can be implemented by comparing content trails using, for example, a degree of overlap between trails, or a commonality of tags. Search methods can be implemented that exploit content trail structures to find content (both individual pages and entire trails) based on keywords. As such, content trails support a broader class of search algorithms than collections of hyperlinked pages since search engines typically use rank algorithms based on pages and links.

As used herein, a "trail generator" refers to a tool implemented using one or more computing devices for forming and navigating content trails.

As used herein, a "content trail" refers to one or more organized ordered sequences of data pages having user-assigned relationships to define at least one path, where an "ordered sequence" refers to a defined arrangement of the data pages as a partially ordered set, a totally-ordered set, a strict sequence, and the like.

As used herein, a "data page" refers to a page from a document, such as a web page, a page from a word processing document, a page from a portable document file (PDF), and the like.

As used herein, a "website" refers to a set of web pages generally located on the same server with the same domain name and "web page" is a single page generally associate with a Uniform Resource Identifiers (URIs) address, such as a Uniform Resource Locator (URL) address. To move from first web page to second web page, the first web page generally includes a hyperlink to the second web page embedded therein that must be selected by a user.

As used herein, a "reference" refers to an identifier associated with a data page. References can be user-defined, predefined, or otherwise specified, and can include, for example, addressing schemes including Uniform Resource Locators (URLs), Uniform Resource Identifiers (URIs), extensible mark-up language (XML) path (XPath) addresses, sequential numbering and/or alphabetizing schemes, descriptive text identifiers, such as titles of the data pages, and the like.

As used herein, the term "organize" refers to specifying, or otherwise forming one or more ordered sequences and "reorganizing" refers to changing or otherwise modifying previously organized ordered sequences.

As used herein, "retrieving" refers to locating and reading data from a storage location, "generating" refers to the formation a content trail using the trail generator, and "collecting" refers to accumulating intact data pages, or portions thereof, or references to intact data pages, or portions thereof, for use in the generation of a content trail. Data pages can be collected without regard to whether an existing linking structure exists between the data pages.

As used herein, "navigate" refers to following paths of a content trail to view the data pages associated with the content trail.

As used herein, "distributing" refers to making content trail available for viewing, downloading, or otherwise transferring the content trails to one or more users.

As used herein, "modifying" refers to changing, altering, or revising information, such as a content trail, references, or relationships within the content trail.

As used herein, a "relationship" refers to an association between two or more data pages generally defined by a user. The relationship between two or more data pages occurs external to the data pages such that relationships are not inserted into, or defined within, the data pages. As such, the relationships can define external connections between independent discrete data pages so that a connection between the data pages is not defined by hyperlinks within the data pages. A relationship may be arbitrarily or otherwise defined and may be explicit or implicit in nature. Data pages that have a relationship are referred to herein as being "interconnected." Data pages can be disconnected to remove a relationship and can be reconnected to redefined relationships between the data pages.

As used herein, "user-defined" and "user-assigned" refer to specifications received from a user, such as, for example, a specification of a relationship between two data pages.

As used herein, a "computing device" can be a mainframe, personal computer (PC), laptop computer, workstation, handheld device, such as a PDA, or the like, that includes a processing unit and is configured to implement the trail generator or at least a portion of the trail generator.

As used herein, "explicit selection" refers to an interaction between a user and the trail generator to collect a particular data page desired by the user, where the data page is not collected unless the user selects it.

As used herein, "activate" refers to initiating or triggering an action. Activation can result from, for example, the selection of a button, or other object, in a graphical user interface. For example, a user can click on a button using a mouse to initiate an operation performed by the trail generator.

As used herein, "depicting" refers to rendering information on a display in a viewable form.

As used herein, a "graphical reference object" refers to a visual representation of a reference and can include, for example, various shapes, with or without textual components, thumbnail images, or other indicia used to portray a reference to a data page.

As used herein, "graphical user interface" refers to an area or region being displayed to a user to allow the user to interact with the trail generator.

As used herein, "common data page" refers to data pages included in at least two independent content trails such that the common data page represents an intersection between the at least two independent content trails.

A "repository" or "database" refers to a storage system in which information, such as content trail are stored. The information stored in the repository or database is accessible to one or more users, where "accessible" refers to the ability to retrieve information from the repository or database.

As generally understood by those skilled in the art, "metadata" refers to information about information. Examples of metadata that can be associated with references to data pages include a label, the referenced data pages itself, permission levels associated with nodes for various sorts of editing and sharing, copyright information for individual referenced pages, version information for dynamic pages, such as from wikis, and the like. The metadata can include a description of the data pages represented by the references, a description of the relationship between the references, a starting and/or end point in the content trail, a version of the data pages, a date on which the data pages was collected, a version number, and the like.

As used herein, the term "concatenate" refers to appending a content trail to the end of a path in an existing content trail so that a new content trail is formed including data pages from the existing content trail and the appended content trail.

As used herein, a "path" refers to a contiguous sequence of data pages from a first data page to a last data page, where adjacent pages are connected based on a defined relationship. A path can diverge into two or more separate paths, where each path includes a sequence of data pages, and can converge into a single path, where two or more sequences of data pages join at a common data page.

As used herein, a "visual diagram" refers to a chart or graph that displays information based on a position, color, shape, and the like, of objects and/or connections defined between the objects. An example of a visual diagram is a directed graph is that includes nodes and edges to define a hierarchical structure of the nodes.

As used herein, a "web browser" or "browser" refers to a software application implemented using a computing device to access and navigate the Internet, Intranet, or other compilation of files generated in suitable mark-up languages.

A "plug-in" or "add-on" refers to an application that interacts with a host application, such as a web browser, to provide extend the operation of the host application to include operation supported by the plug-in.

As used herein, a "workspace" refers to a graphical user interface (GUI) defining a container in which a user can arrange graphical reference objects referencing collected data pages and define relationships between the graphical reference objects to generate a content trail.

As used herein, a "hopper" refers to a GUI in which graphical reference objects are displayed prior to be being inserted into the workspace.

An "underlying data structure" refers to a data file that maintains information concerning the references to the data pages collected and the user-assigned relationships between the data pages to facilitate depicting a content trail using a visual diagram.

FIG. 1 depicts a block diagram of a trail generator 100 that includes a content collecting unit 110 (hereinafter "collector 110"), a trail defining unit 120, and a trail navigating unit 130. The trail generator 100 can be used to generate a data model of a content trail using data pages discovered by a user. The data pages can be collected without regard to an absence of an existing link structure between the data pages. The trail generator 100 allows a user to generate a content trail having one or more sequences of data pages arranged in a user defined order and having user-defined relationships between the data pages. For example, the trail generator 100 can allow a user to organize selected data pages based on the user's preferences. In some embodiments, the data model can be generated and displayed as a directed graph including nodes as references to the data pages and edges as relationships between the nodes. The content trails can be navigable using different perspectives so that the data pages represented by the content trails can be browsed according to the ordered sequenced of the data pages and the user defined relationships.

The collector 110 can include a graphical user interface (GUI) 112 and a selection unit 114. The collector 110 enables a user to selectively and/or arbitrarily collect data pages, intact and in its original unaltered form, to be included in a content trail in response to an explicit activation of the selection unit 114. The GUI 112 can be a stand alone user interface or can be embedded in an application, such as a web browser, web application, software plug-in, and/or the like. The selection unit 114 can include one or more graphical objects or widgets, such as a button, check box, toggle switch, or other selection mechanisms implemented as an instance of an object or widget in the GUI 112. The GUI 112 allows users to explicitly select data pages to be included in the content trail by interacting with the selection unit 114 using a data entry device, such as a mouse, keyboard, touch screen, microphone, and the like. Once a user has selected the data pages, the selection unit 114 stores the selected data pages or a reference to the selected data pages in a storage medium for further processing by the trail generator 100.

The trail defining unit 120 can include a workspace 122, in which references can be depicted as graphical representations of the selected data pages and can be arranged in a user-defined, ordered sequence. A user can organize the selected data pages into a desired, ordered sequence by defining relationships between the data pages to define a structure of the content trail. Relationships between the selected data pages can be defined by the user to interconnect the data pages associated with the content trail without inserting or defining links within the data pages. The workspace 122 can include a hopper 124, in which the graphical representations first appear after the user has collected the data pages, and can include a trail forming area 126, in which the user can arrange the graphical representations and connect the graphical representations to define relationships between the data pages. In some embodiments, content trails can be created explicitly within a website, by partially sequencing and labeling one or more sets of data pages collected. In some embodiments, content trail can be created by applications running on a user's computing device based on data pages collected.

In some embodiments, the content trail is a visual diagram in the form of, for example, a directed graph, where the nodes, represented as circles or other shapes, reference the selected data pages and the edges, represented as lines with directional arrows extending between nodes, illustrate the relationships between the references. Nodes of a content trail implemented as a directed graph can reference to the data pages by associating a unique identifier with the data pages. For example, the nodes can represent addressing schemes including URLs, URIs, XPath addresses, or other unique identifiers. Another scheme can include referencing the data pages using a sequential numbering and/or alphabetical system, where the numbers and/or letters are associated with the data pages based on the order specified by the user. Other schemes can allow a user to enter a descriptive identifier of the data pages, such as a title or summary of the data pages.

The edges in the directed graph can represent a relationship between the nodes to impose a partial or total ordering on the data pages associated with the content trail. The edges can be created explicitly, or can be created to mirror naturally-occurring relationships of the data pages. For embodiments implementing a sequential numbering scheme to reference the data pages, the relationships can be defined based on the numbers assigned to data pages such that consecutive numbers are defined as being related.

Metadata defining additional information can be associated with the content trails including, but not limited to a label, the referenced data pages itself, permission levels associated with nodes for various sorts of editing and sharing, copyright information for individual referenced pages, version information for dynamic pages, such as from wikis, and the like. The information can include a description of the data pages represented by the references, a description of the relationship between the references, a starting and/or end point in the content trail, a version of the data pages, a date on which the data pages was collected, a version number, and the like. The metadata can also be implemented to restrict access to selected data pages, prevent modification of references, relationships, and/or at least portions of the content trail. The additional information can be associated with individual nodes, edges, sections of a content trail, and/or the entire content trail.

A content trail may be stored in a distributed manner, such that portions of the content trail are stored in separate logical regions and/or separate physical regions. Content trails can be a base data structure for an object model with operations, such as add node, delete node, tag node, and the like. The user can reorganize the data pages and redefine the relationships between the data pages as desired. The content trail itself can be expressed based on an underlying XML document, database schema, or other suitable data format.

The trail navigating unit 130 provides a GUI 132 for displaying the content trail in a navigable form. For example, for embodiments where the content trails are implemented as a directed graph, the GUI 132 can display the directed graph as well as information included in the metadata. The GUI 132 can display a "read-only" view of the content trail so that users of the content trail can browse the trail and/or make a copy of the trail, but cannot modify the content trail. In some embodiments, the trail navigating unit 130 and the trail defining unit 120 can be integrated so that users can browse and modify a content trail as they navigate the content trail.

Embodiments of the trail navigating unit 130 can display the content trail using different views. As one example, the content trails can be displayed using a trail view such that the content trail is displayed as an interactive directed graph. As another example, the content trail can be displayed using a local view, in which the data pages associated with a reference in the content trail is displayed side-by-side with the content trail or side-by-side with trail markers selectable by the user to navigate through the content trail. As yet another example, users can follow a content trail using a "play button" metaphor so that the data pages of the content trail is automatically navigated and displayed to the user. This view is referred to herein as a "slide show view." As the user navigates a content trail, the user can view the data pages and the trail navigating unit 130 can identify other trails, on which the data pages is included. This allows a user to jump from one content trail to another using the common data pages intersecting multiple content trails.

Figure 2:
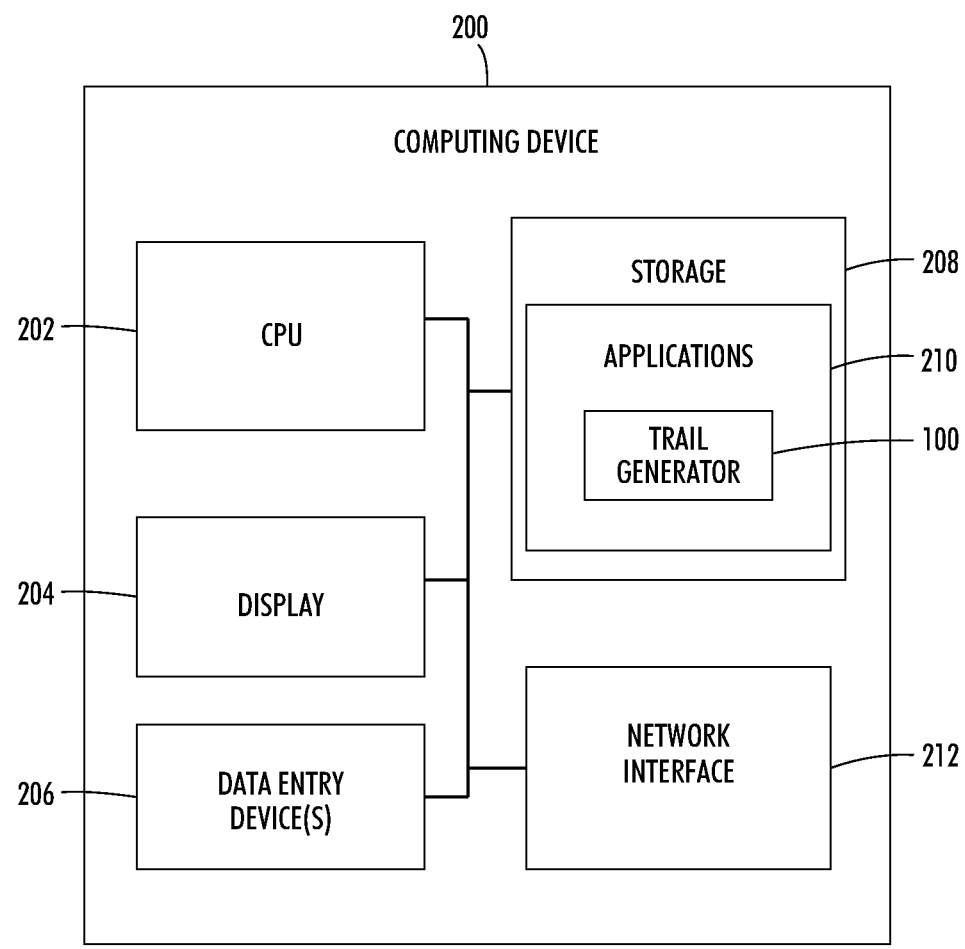
FIG. 2 depicts an exemplary computing device for generating content trails to facilitate discovery, organization, and processing of data content using embodiments of the trail generator.

FIG. 2 depicts an exemplary computing device 200 for generating content trails to facilitate discovery, organization, and processing of data pages using the trail generator 100. The computing device 200 can be a mainframe, personal computer (PC), laptop computer, workstation, handheld device, such as a PDA, or the like. In the illustrated embodiment, the computing device 200 includes a central processing unit (CPU) 202 and can include a display device 204. The display device 204 enables the computing device 200 to communicate with an operator through a visual display. The computing device 200 can further include data entry device(s) 206, such as a keyboard, touch screen, microphone, and/or mouse. The computing device 200 can include storage 208 for storing data and instructions, such as collected data pages, generated content trails, defined relationships between the data pages, applications, and the like. The storage 208 can include such technologies as a floppy drive, hard drive, compact disc, tape drive, Flash drive, optical drive, read only memory (ROM), random access memory (RAM), and the like.

Figure 3:
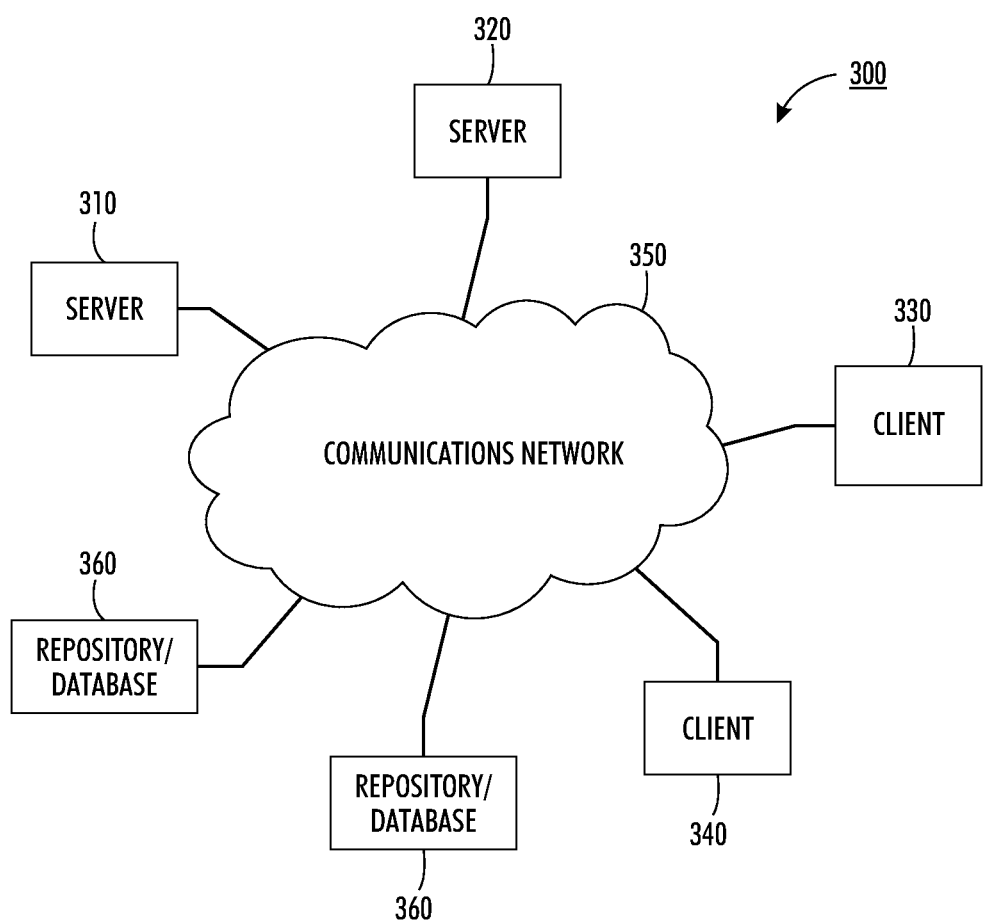
FIG. 3 depicts an exemplary distributed system for implementing embodiments of the trail generator.

Applications 210, such as the trail generator 100, can be resident in the storage 208. The applications 210 can include instructions for implementing the trail generator 100. The instructions can be implemented using, for example, C, C++, Java, JavaScript, Basic, Perl, Python, assembly language, machine code, and the like. The storage 208 can be local or remote to the computing device 200. The computing device 200 includes a network interface 212 for communicating with a network. The CPU 202 operates to run the applications 210 in storage 208 by performing instructions therein and storing data resulting from the performed instructions, which may be presented to a user via the display 204 or by other mechanisms known to those skilled in the art, such a print out from a printer. The data can include the collected data pages, references to the collected data pages, relationships between the collected data pages, generated content trails, information associated with the content trails, and the like FIG. 3 depicts an exemplary distributed system 300 for implementing embodiments of the trail generator 100. The distributed system 300 includes one or more servers 310 and 320 coupled to clients 330 and 340, via a communication network 350, which can be any network over which information can be transmitted between devices communicatively coupled to the network. The system 300 can also include repositories or database devices 360, which can be coupled to the servers 310/320 and clients 330/340 via the communications network 350. The servers 310/320, clients 330/340, and database devices 360 can be implemented using a computing device, such as a computing device implemented in a similar manner as the computing device 200 of FIG. 2. In some embodiments, the trail generator 100 can be implemented using a single computing device or can be implemented using multiple computing devices in a distributed manner.

The servers 310/320, clients 330/340, and/or databases 360 can store information, such as collected data pages; references to the collected data pages; user-defined relationships between the data pages, information associated with the data pages, references, and relationships; generated content trails; and the like. In some embodiments, the trail generator 100 can be distributed among the servers 310/320, clients 330/340, and database devices 360 such that one or more components of the trail generator 100 and/or portion of one or more components of the trail generator 100 can be implemented by a different device (e.g. clients, servers, databases) in the communication network 350. For example, the collector 110 can be resident on the server 310 and/or the client 330, the trail defining unit 120 can be resident on the server 320, the trail navigating unit 130 can be resident on the client 330, and the collected data pages, generated content trails, and information associated with the generated content trails can be stored in one or more of the database devices 360. For embodiments where at least a portion of the collector 110 is resident on the client 330, the at least a portion of the collector 110 can be implemented as part of, for example, a web browser or mobile phone widget.

Communication between the various devices of the distributed system can be implemented using various protocols and technologies. Devices communicating over the communications network can interact using pier to pier (P2P) and/or client-server based protocols implementing web service calls, user-mediated e-mail, SMPP, and the like. As one example, content trails can be sent by electronic mail (e-mail)

to an e-mail address, using, for example, a server-side script, or a client-side invocation of a mail client. As another example, websites enabled to develop and/or use content trails can collaborate using many communication techniques, such as hypertext transport protocol (HTTP) based protocols to expose the creation, editing and trail-following functionality within individual sites via an application program interface (API). In this manner, a site owner can continue a content trail defined on the site owner's website, on another site, by sending a request to the other site, which shows up as a request to create/continue a content trail in the administrator interface of the second website. As yet another example, client-server communication models can be used to store and access trails from repositories.

Figure 4:
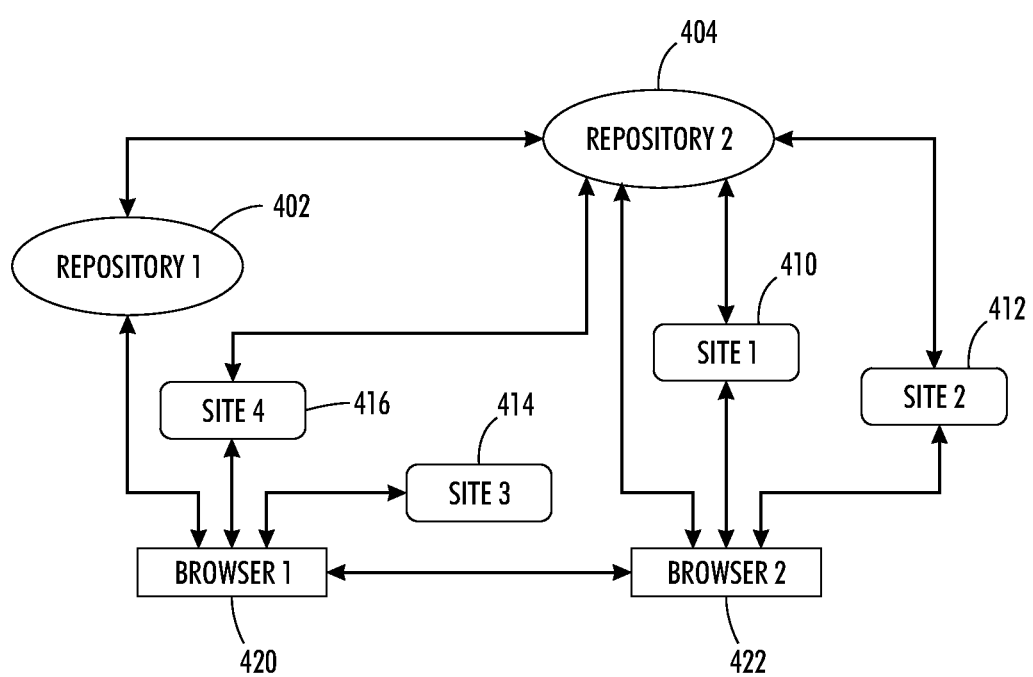
FIG. 4 is a block diagram of an exemplary flow of information in a distributed system, such as the distributed system depicted in FIG. 3.

FIG. 4 is a block diagram of an exemplary flow of information in a distributed system, such as the distributed system depicted in FIG. 3. Content trails can be stored in data repositories, such as a first repository 402 and/or a second repository 404, which can be communicatively coupled to exchange information, such as content trails, stored in the first and second repositories 402 and 404. The repositories can include storage devices, which can be accessible via specially designed websites, to store and collaboratively process content trails.

Websites 410, 412, 414, and 416 implemented, for example, by one or more servers can include predefine content trails. In some embodiments, the predefined content trails can be included on the websites 410, 412, 414, and 416 using plug-ins adapted to application program interfaces of individual content management systems that are enhanced to implement the trail generator 100. The content trails included can be stored and retrieved from, for example, the second repository 404 by the websites 410, 412, 414, and 416. In some embodiments, the websites 410, 412, 414, and 416 can enable users to directly create and use content trails through back-end functionality, without requiring special client side technology, so that users can visit a website, generate a content trail using the website, and store the content trail to be retrieved via the website at a later time.

Internet browsers (hereinafter "browsers"), such as browser 420 and 422 implemented by client devices, can navigate to one or more of the websites 410, 412, 414, and 416 to access content trails included in the one or more of the websites 410, 412, 414, and 416. Users of the browsers 420 and 422 can use the content trails to view data pages associated with the content trails by following the content trails using the trail navigation unit 130. In some embodiments, the browsers 420 and 422 can generate an editable copy of the predefined content trails included on one or more of the websites. The editable copy can allow a user of the browsers 420 and 422 to modify the predefined content trails to generate a new content trail based on the predefined content trail, which can in turn be stored in the first and/or second repositories 402 and 404 for future access. Users of the browsers 420 and 422 can also generate their own content trails, which can be shared with each other, stored in the repositories 402 and/or 404 or uploaded to one or more of the websites 410, 412, 414, and 416.

The communication model of the exemplary flow of information in the distributed system can include P2P and server-client communications. As one example, two websites using the same content management system can interact using P2P-based communication to exchange content trails, share content trails, co-define content trails, and the like. As another example, a browser implementing a toolbar including at least a portion of the trail generator 100 and a plug-in-enabled website including at least a portion of the trail generator 100 can interact using client-server based communication. Likewise, a website and a repository can interact using client-server based communication.

Using an architecture for distributed content, as described herein, allows for complex forms of processing and interaction, with a highly expressive data model and without a central clearing house type site through which the content trails can be saved and retrieved. Instead of a central clearing house type site, multiple clearing house types sites capable of facilitating shared repositories are provided, the implementation of which can be based on architectures similar to link root nameservers used by the Internet.

Figure 5:
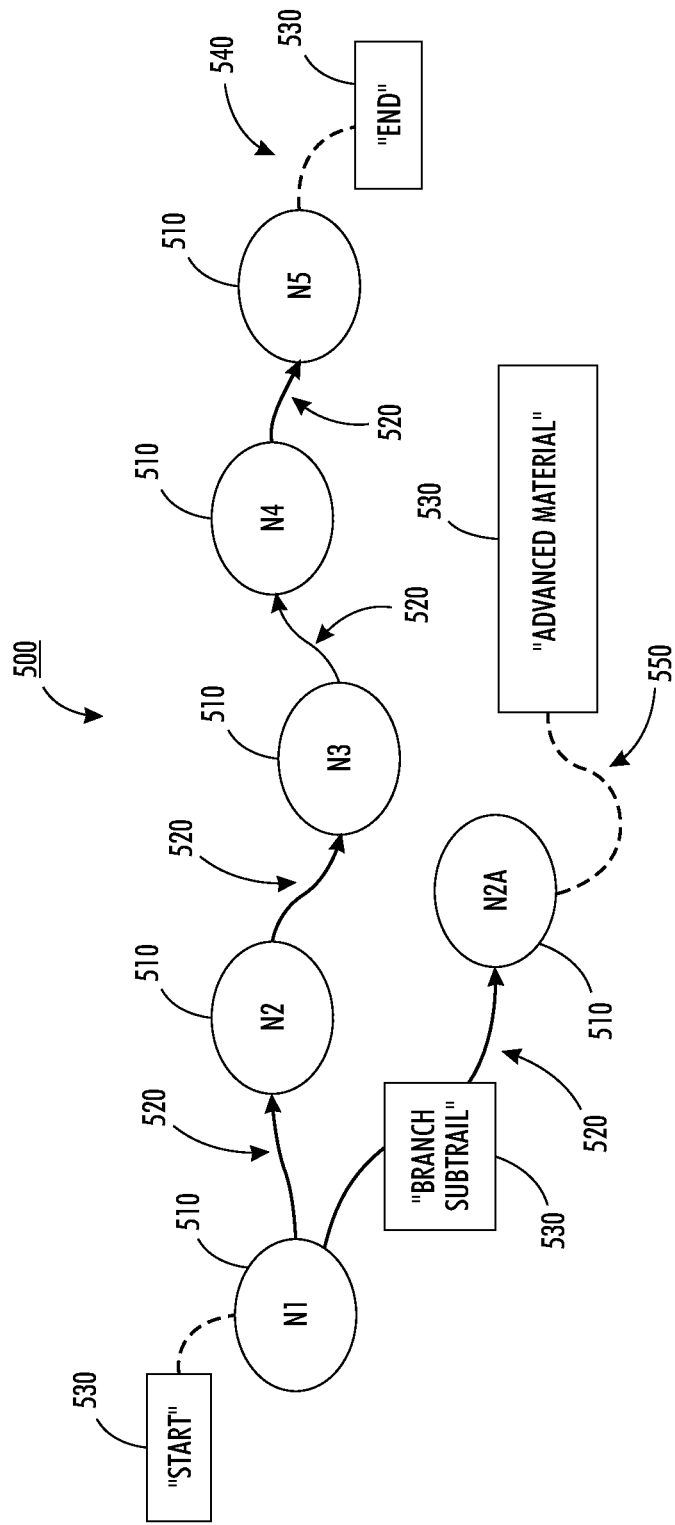
FIG. 5 is an exemplary content trail in the form of a directed graph that can be generated using embodiments of the trail generator.

FIG. 5 is an exemplary content trail in the form of a directed graph 500 that can be generated using the trail defining unit 120 of the trail generator 100. The directed graph 500 includes nodes 510, edges 520, and metadata 530. The nodes 510 represent a data page that has been collected by a user to be included in a content trail. The edges 520 represent relationships defined between the data pages. For example, the nodes 510 can represent data pages, such as intact web pages, in their original form, collected by the user using the collector 110. Each of the nodes 510 can be organized into ordered sequences, which can be defined by the creator of the content trail. The edges 520 between the nodes 510 can define relationships between the nodes to designate paths that can be followed by a viewer along the ordered sequences without requiring links to between the data pages to exist within the data pages. In the present example, the content trail represented by the directed graph 500 includes a path 530 and a path 540 based on the relationships (e.g., edges 520) that have been defined between the nodes 510.

Figure 6:
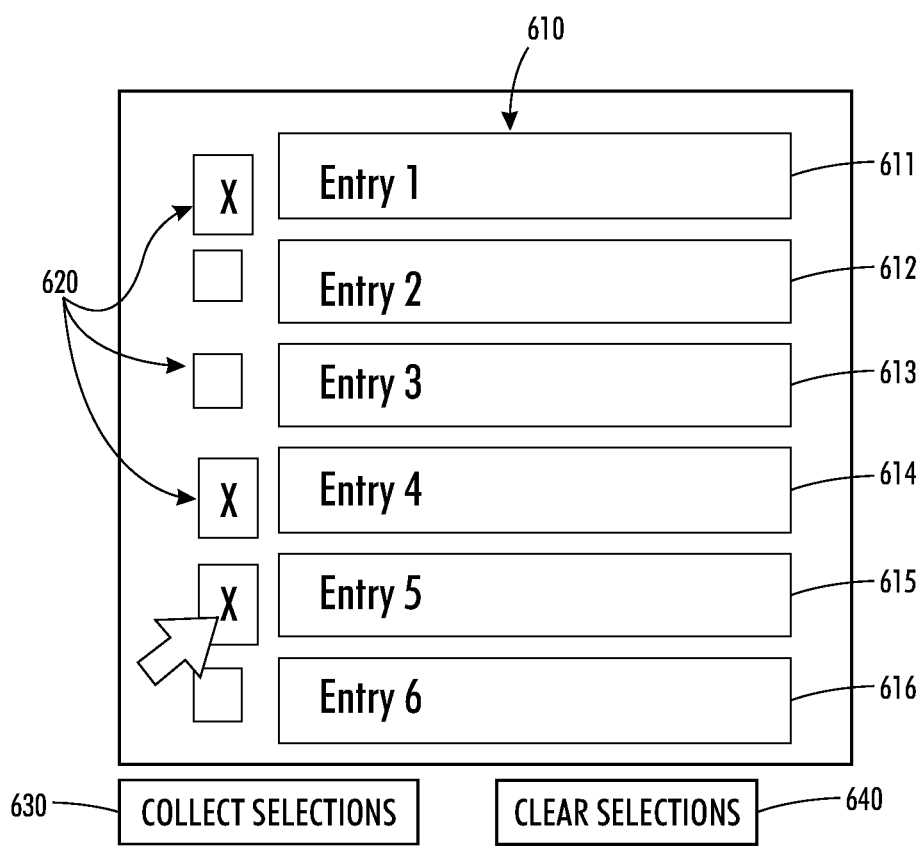
FIG. 6 illustrates an exemplary implementation of a collector of a trail generator in a content management website.

FIG. 6 illustrates an exemplary implementation of the collector 110 of trail generator 100 implemented as a plug-in in a content management website configured, for example, to allow a user to develop and publish a blog. The user of the web site can have an account with the content management website. Upon logging into the account, the user can choose to install the trail generator, or portions thereof, as a plug-in so that the function of the web site is enhanced to implement content trail development. In some embodiments, the trail generator can already be integrated with the website that no action is required by the user to make the trail generator available for use.

The user can submit entries to the blog developed using the website and the website can publish the entries so that visitors of the blog can view the entries. To enhance the experience of visitors, the user can generate content trails using the trail generator. To achieve this, the user can explicitly or otherwise collect a selection of entries to be included in the content trail. In the present embodiment, the user can be presented with a list 610 of blog entries 611-616, which can represent some or all of the entries submitted by the user. The user can select one or more of the entries 611-616 to include in the content trail by activating check boxes 620 associated with the entries 611-616. For example, the user can select check boxes corresponding to entries 611, 614, and 615.

When the user has selected the entries to include in a content trail, the user can select a "Collect Selections" button 630. Upon activation of the button 630, references to the entries can be stored in a hopper, which provides an intermediate area for holding references to selected data pages prior to the references being inserted into a content trail, or references to the selected entries can be inserted directly into the content trail. If the user wishes, to clear selected entries to restart to selection process, the user can activate a "Clear Selections" button 640.

Figure 7:
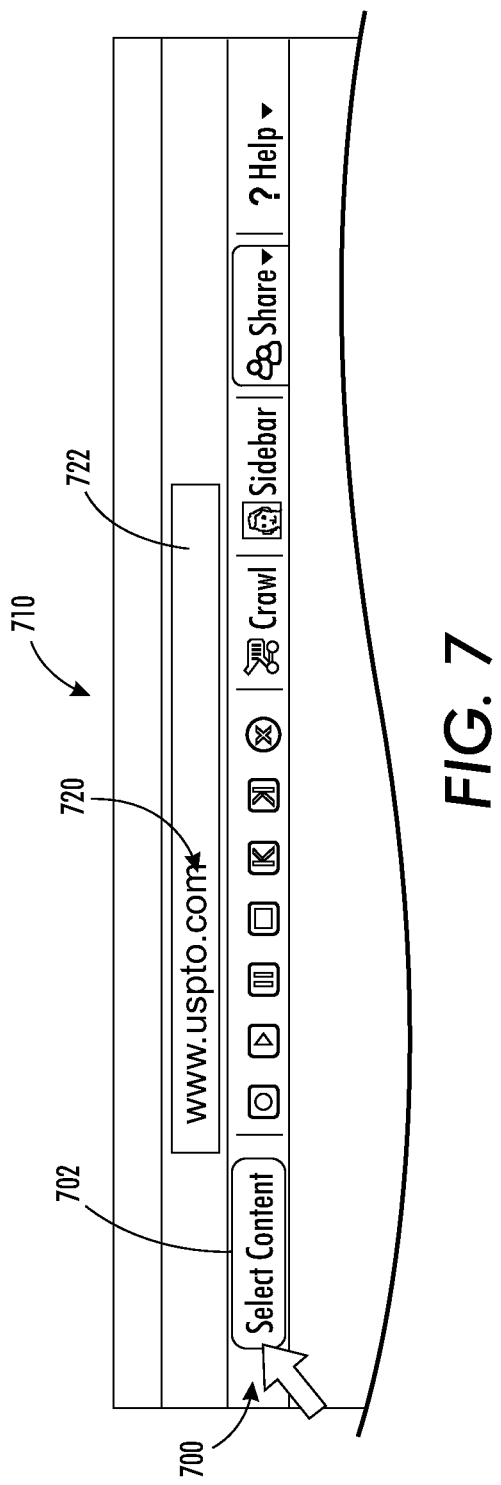
FIG. 7 illustrates another exemplary implementation of a collector for some embodiments of the trail generator.

FIG. 7 illustrates another exemplary implementation of the collector 110 of the trail generator 100. In the present embodiment, the collector 110 can be implemented as a toolbar 700 of a web browser 710. The toolbar 700 can include a "Select Content" button 702. Using the web browser 710, the user can navigate to a website by entering a uniform resource locator (URL) address 720 in a data entry field 722 or can navigate to a website via a search result obtained through a search engine. When the user reaches a web page that the user wishes to collect, the user can activate the button 702, which results in a reference to the web page being stored for use in a content trail. For example, the reference can be inserted into a hopper, which temporarily stores the reference to the web page until it is inserted into a content trail. In some embodiments, the references can be the URL address or any other unique identifier that is a predefined identifier or an identifier assigned by the user.

Figure 8:
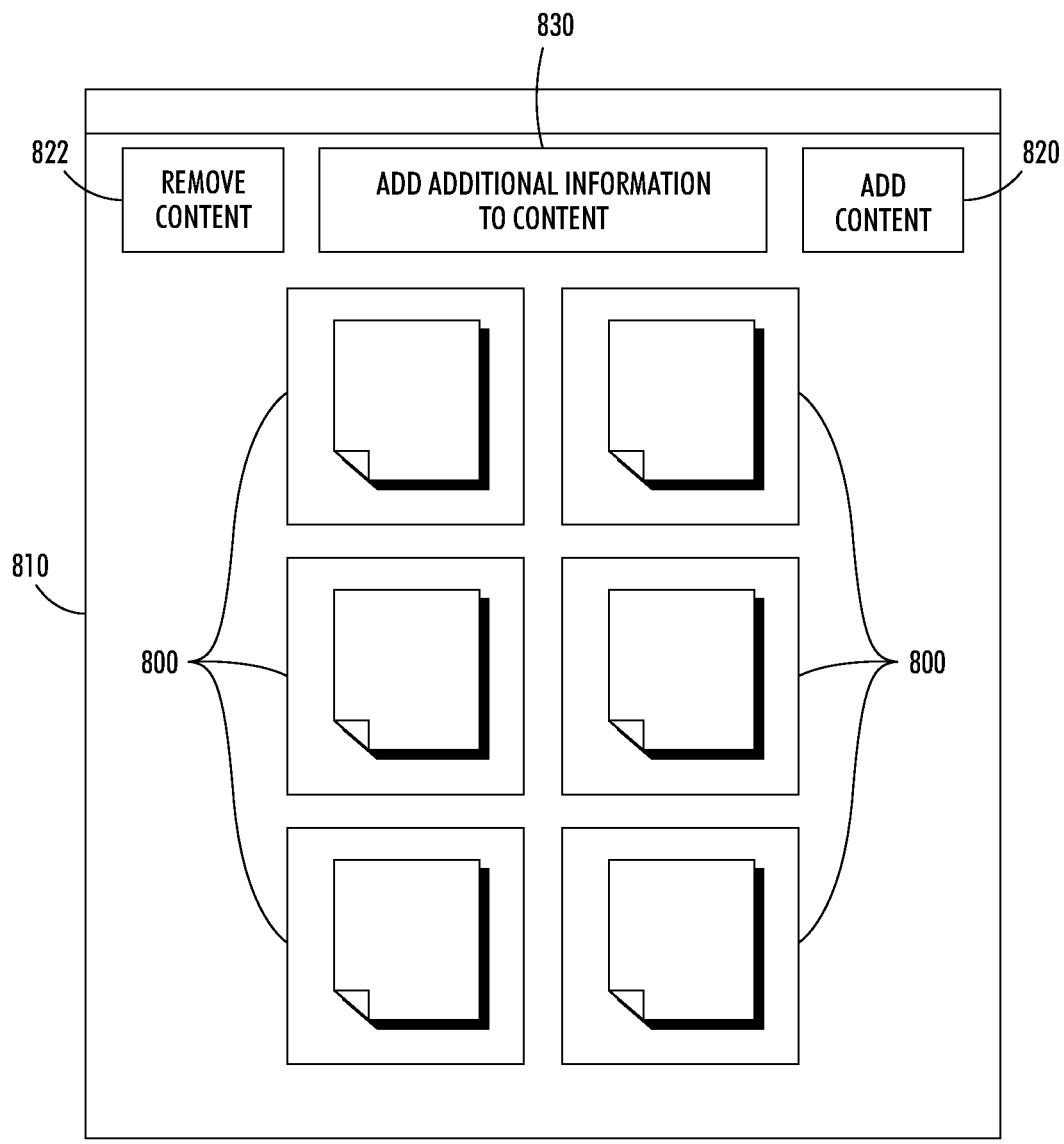
FIG. 8 illustrates an exemplary implementation of a portion of the trail generator.

FIG. 8 illustrates an exemplary implementation of a portion of the trail generator. After the data pages are collected, for example, as illustrated in FIGS. 6 and 7, references 800 can be displayed to the user in a hopper 810. The references can be represented as, for example, geometric shapes, a text-based descriptions, thumbnail images of what the data pages looks like when displayed, and the like. The user can view the data pages referenced by references 800 by selecting one or more of the references 800 (e.g., by double clicking on the references with their mouse). The user can add and/or remove one or more of the references 800 to the data pages using an "Add Content" button 820 and a "Remove Content" button 822, respectively. If the user activates the button 820, the user can return to collecting data pages as described herein. In addition, an "Add Addition Information to Content" button 830 can allow a user to add metadata to the references 800, such as labels, descriptions, permission levels, and the like.

Figure 9:
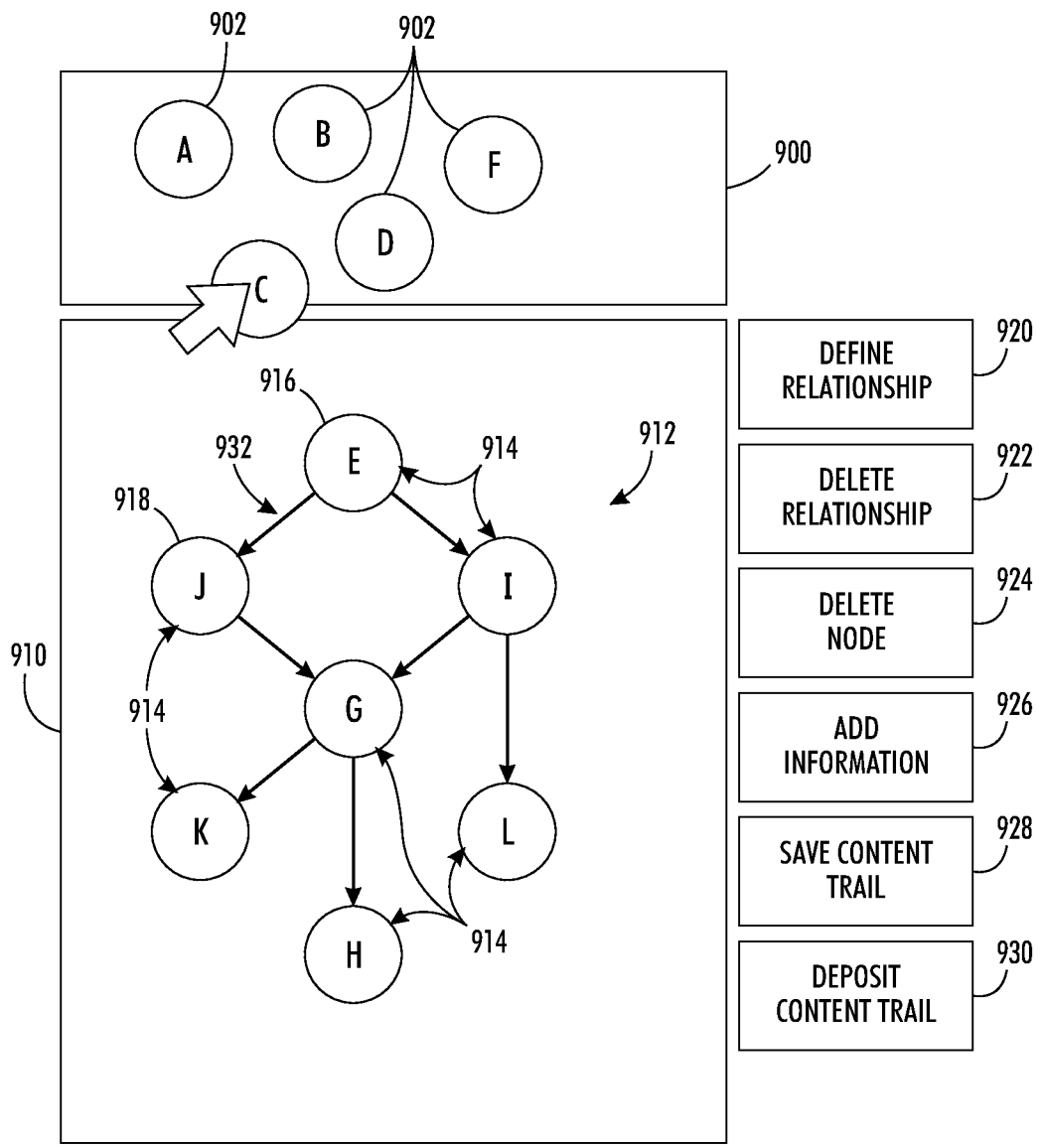
FIG. 9 illustrates an exemplary implementation of a trail defining unit of embodiments of the trail generator

FIG. 9 illustrates an exemplary implementation of the trail defining unit 120 of the trail generator 100. The exemplary implementation of the trail defining unit 120 includes a hopper 900, a trail forming area 910, a "Define Relationship" button 920, a "Delete Relationship" button 922, a "Delete Node" button 924, an "Add Information" button 926, a "Save Content Trail" button 928, and a "Deposit Content Trail" button 930. The hopper 900 holds references 902 to data pages that has been collected by the user, but that has not been inserted into a content trail. In the present embodiment, the references to the data pages are represented graphically as circles surrounding an identifier that identifies the data pages being referenced. In some embodiments, the references can be thumb nail images of the data pages. For example, the references can be a thumb nail image of a web page that has been collected.

The trail forming area 910 depicts a content trail 912 being formed by the user. To move the references from the hopper 900 to the area 910, the user can use a click-and-drag function implemented with a pointing device, such as a mouse. For example, the user can click on a reference 904 and drag the reference 904 into the area 910.

To form the content trail 912, the user can arrange references 914 that have been inserted into the area 910 using the click-and-drag function to position the references 914 in a desired location. By activating the button 920, the user can use a line drawing tool to draw lines between the references 914 to define relationships between the data pages referenced by the references 914. For example, the user can draw a line 932 between a reference 916 and a reference 918 with an arrow head pointing to the reference 918. The relationship defined between the data pages occurs external to the data pages such that the relationships are not inserted into data pages and the data pages themselves are not modified or changed. For example, an existing link structure within the data pages remains unchanged. As such, the relationships can define connections externally between independent discrete data pages maintained by the content trail so that a connection between the data pages is not defined by hyperlinks within the data pages. If the user wishes to delete a relationship, the user can activate button 922 can select the relationship to be deleted. Likewise, the user can delete a reference node from the content trail 912 by activating the button 924 and selecting the reference node to be deleted.

If a user wishes to add metadata to the content trail 912, the user can activate button 926, which in some embodiments, can result in a display of a submenu that provides the user with an option of types of information to be added. To associate the metadata with a reference node or a relationship line, the user can select the reference node or relationship line.

The user can save the content trail 912 by activating the button 928. For embodiments where the user develops the content trail using the trail generator as part of a content management website, such as a website for developing and maintaining a blog, the website can save the content trail to storage associated with the website and can associate the content trail with the account of the user. For embodiments where the user develops the content trail using an implementation of the trail generator on the user's computing device, the content trail 912 can be stored in storage associated with the user's computing device. Additionally, the user can choose to deposit the content trail 912 in a repository by activating the button 930.

As the user develops the content trail 912 using the trail defining unit 120, an underlying data structure is maintained, such that when a reference node is inserted into the area 910, the underlying data structure is updated to include information concerning the reference node. Likewise, when a relationship is defined by the user in the area 910, the underlying data structure is updated to reflect the relationship. Therefore, the trail defining unit 120 can define a container for maintaining the content trail 912 such that the references and the relationships between them are included in the data structure. In some embodiments, the underlying data structure can be an XML document.

FIG. 10 shows exemplary portions of an XML document 1000 that can function has an underlying data structure for maintaining a content trail that can be depicted to a user. The XML-based data structure defines sections that can be mapped to an object of a content trail including graphical objects, such as nodes and edges, as well as metadata. In the present example, the XML document 1000 includes a container section 1010 that encapsulates the content trail within the XML document 1000. The container section is defined as a "trail" by tag 1012, which can be used to identify the XML document 1000 as an underlying data structure for a content trail. The XML document includes a name "New Trail" using the tag 1014 and identifies a location at which the content trail can be retrieved using source tags 1016.

Sections 1020 and 1040 are included within the container section 1010 and represent nodes of the content trail referencing data pages included in the content trail as well as the relationship of the nodes with other nodes in the content trail. For example, section 1020 can be identified as a node using tag 1022 having a name "Three Leaps of Faith Rule" specified by a name tag 1024. A location at which the data page referenced by the node can be retrieved is identified using the source tags 1026.

The relationship of the node identified in section 1020 to other nodes in the content trail can be represented as children of the node. In the present embodiment, a children tag 1028 can identify which nodes have been defined to be related to the node of section 1020. For example, a single node identified by tag 1030 has been defined to have a relationship with the node of section 1020, which in a directed graph is illustrated as a line from the node identified in section 1020 to the related node defined by tag 1030.

To identify the nodes within the XML document 1000, the nodes can include a unique identifier specified in the node type tags (e.g., 1012, 1030). For example, the tag 1030 includes an identifier 1032 that has been uniquely assigned to a node in the XML document 1000. The node identified by the identifier 1032 is defined by section 1040, which is related to nodes identified by tags 1042 and 1044 encapsulated by the children tag 1046. Thus, in the present example, a content trail name "New Trail" includes a node referencing a data page named "Three Leaps of Faith Rule," which is connected to a node referencing a data page named "Happy First Birthday, Ribbonfarm" by a relationship defined by a user, which in turn is connected to two other nodes creating a diverging paths in the content trail.

Figure 11:
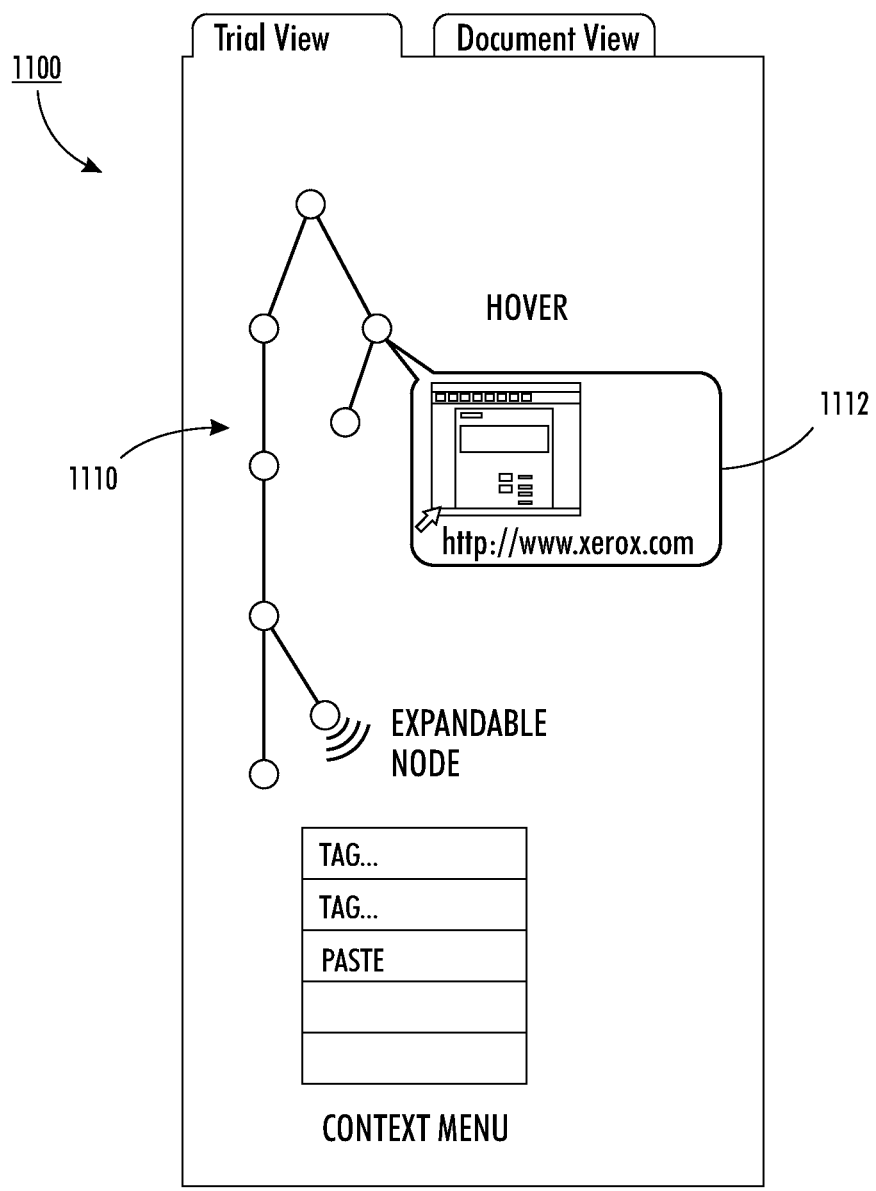
FIG. 11 illustrates an exemplary implementation of a trail navigating unit of embodiments of the trail generator.

FIG. 11 illustrates an exemplary implementation of the trail navigating unit 130 of the trail generator 100. In the present embodiment, a trail view 1100 can be used to navigate a content trail 1110. The content trail can be displayed as a directed graph including nodes referencing data pages of the content trail and lines or edges connecting the nodes to define a relationship between the data pages. The user can preview the data pages referenced by the nodes in the content trail 1110 by positioning a pointing device over the nodes, which results in a pop-up window 1112 displaying information about the data page added by the user as metadata or a thumbnail image of the data page. When the user wishes to view the data page referenced by one of the nodes in the content trail, the user can select the node and the data page can be displayed side-by-side with the content trail, can be displayed by itself, or can be displayed side-by-side with trail markers that can be used to navigate the content trail.

Figure 12:
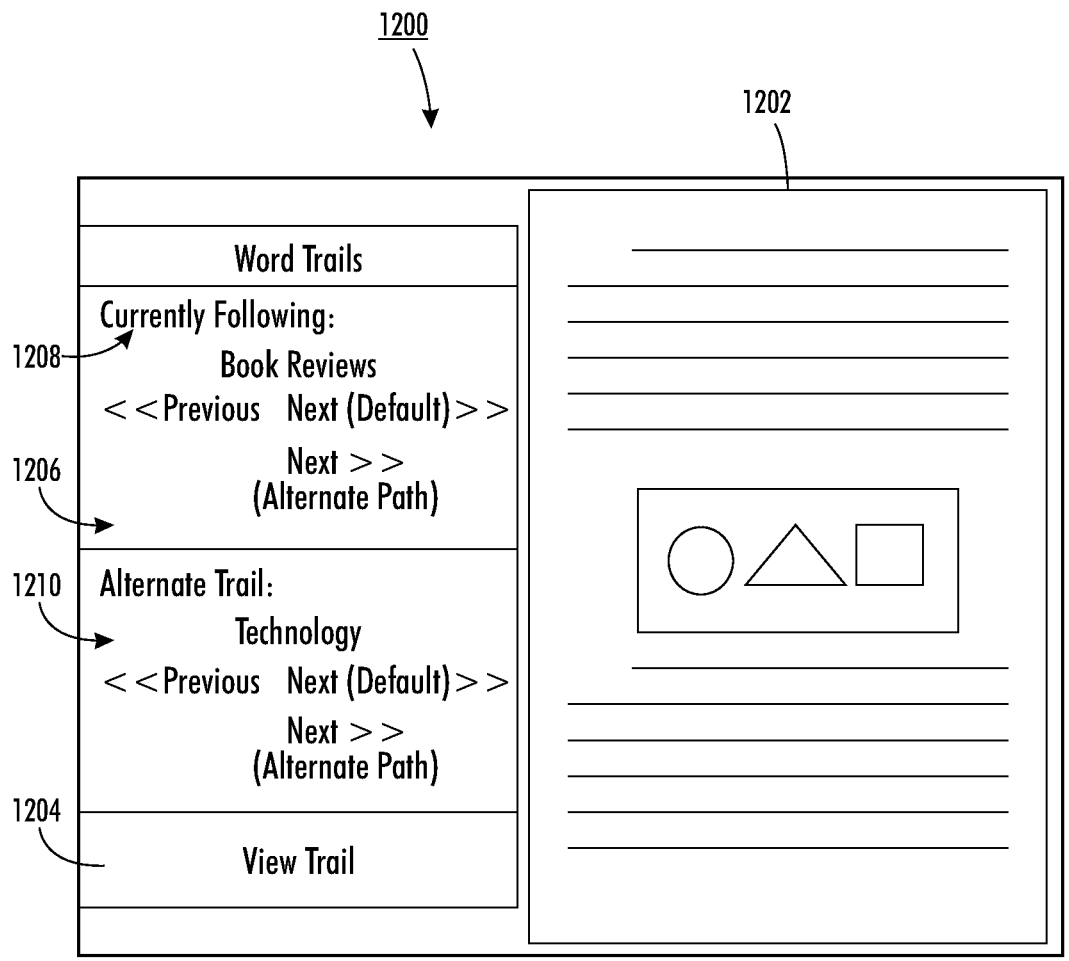
FIG. 12 illustrates another exemplary implementation of a trail navigating unit of embodiments of the trail generator.

FIG. 12 illustrates another exemplary implementation of the trail navigating unit 130 of the trail generator 100 using a "local view". The "local view" refers to displaying data page referenced by a node in the content trail side-by side with trail markers so that the user navigates along the paths of the content trail viewing the data page of each reference node. The local view can be displayed after the user selects a reference node from the directed graph of the content trail such that the data page associated with the reference node can be displayed. For example, a web page 1202 associated with the selected reference node can be displayed in a browser 1200. At any time in the local view if the user wishes to return to the trail view for the content trail currently being followed, the user can select the "View Trail" button 1204, which results in the content trail being displayed as a directed graph. In some embodiments, the user can open the local view without selecting a reference node from the content trail.

A side bar 1206 identifying the current trail 1208 being followed and adjacent reference nodes on the content trail can also be displayed next to the web page 1202 in the browser 1200. In the present example, the current trail 1208 is the "Book Reviews" trail and the adjacent reference nodes are "Previous", "Next (default)", and "Next (alternative)". The Next markers indicate that the content trail splits into two paths. The user can continue along a default path by selecting the Next (default) trail marker or can follow an alternative path by selecting the Next (alternative) trail marker.

In addition, when a referenced data page being displayed exists on other content trails, the other content trails can be identified to allow the user to leave the content currently being followed to follow the newly identified content trail including the referenced data page. For example, referring to FIG. 12, the web page 1202 is referenced on the content trail "Book Reviews" that is currently being followed as well as the content trail 1210 identified as "Technology". If desires to leave the content trail 1208 identified as "Book Reviews", the user can select one of the trail markers identified on the content trail 1210.

Figure 13:
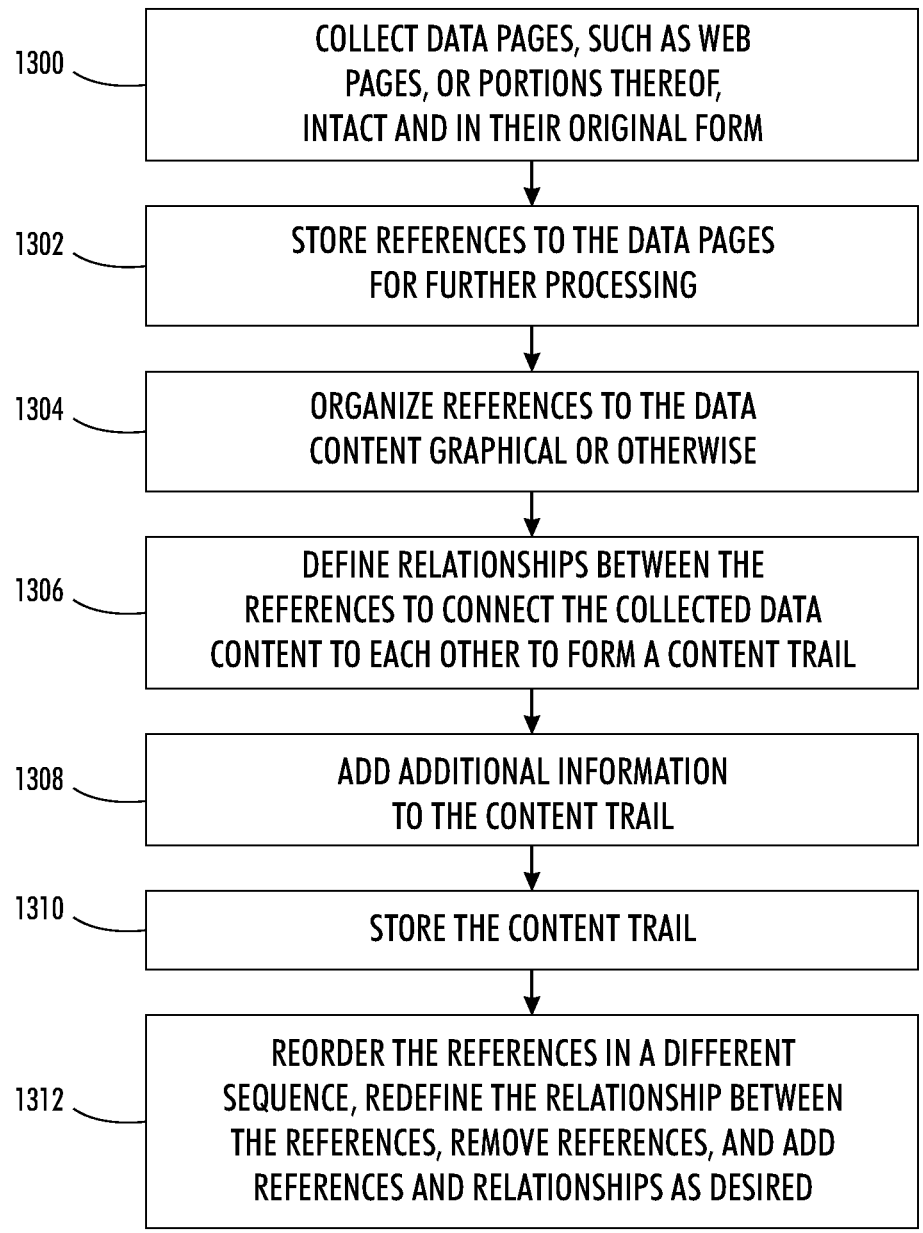
FIG. 13 is a flowchart illustrating a process of generating and storing content trails.

FIG. 13 is a flowchart illustrating a process of generating and storing content trails. A user can collect data pages, such as web pages, or portions thereof, from the Internet intact and in their original form, using the collector 110 of the trail generator 100 (step 1300). The user can selectively and/or arbitrarily collect data pages to be included in a content trail. This allows users to explicitly select data pages to be included in a content trail. Upon selection of the data pages, the collected data pages or references to the selected data pages are stored for further processing by the trail generator 100 (step 1302).

The user can develop a content trail by organizing references to the data pages graphical or otherwise to create an ordered sequence (step 1304) and can define relationships between the references to connect the collected data pages to each other to form a content trail with one or more paths (step 1306). The relationships defined between the references to the data pages, and therefore the data pages themselves, occurs external to the data pages such that the relationships are not inserted into data pages and the data pages themselves are not modified or changed. For example, an existing link structure within the data pages remains unchanged. The relationships define connections between independent discrete data pages maintained by the content trail so that a connection between the data pages is external to the data pages and is not defined by hyperlinks within the data pages.

Additional information can be added to the content trail in the form of, for example, metadata (step 1308) and the content trail can be stored (1310). The content trail can be stored in the user's local storage or in remote storage. If the user wishes to modify the content trail, the user can reorder the references in a different sequence, redefine the relationship between the references, remove references, add references and relationships, and the like (step 1312).

Figure 14:
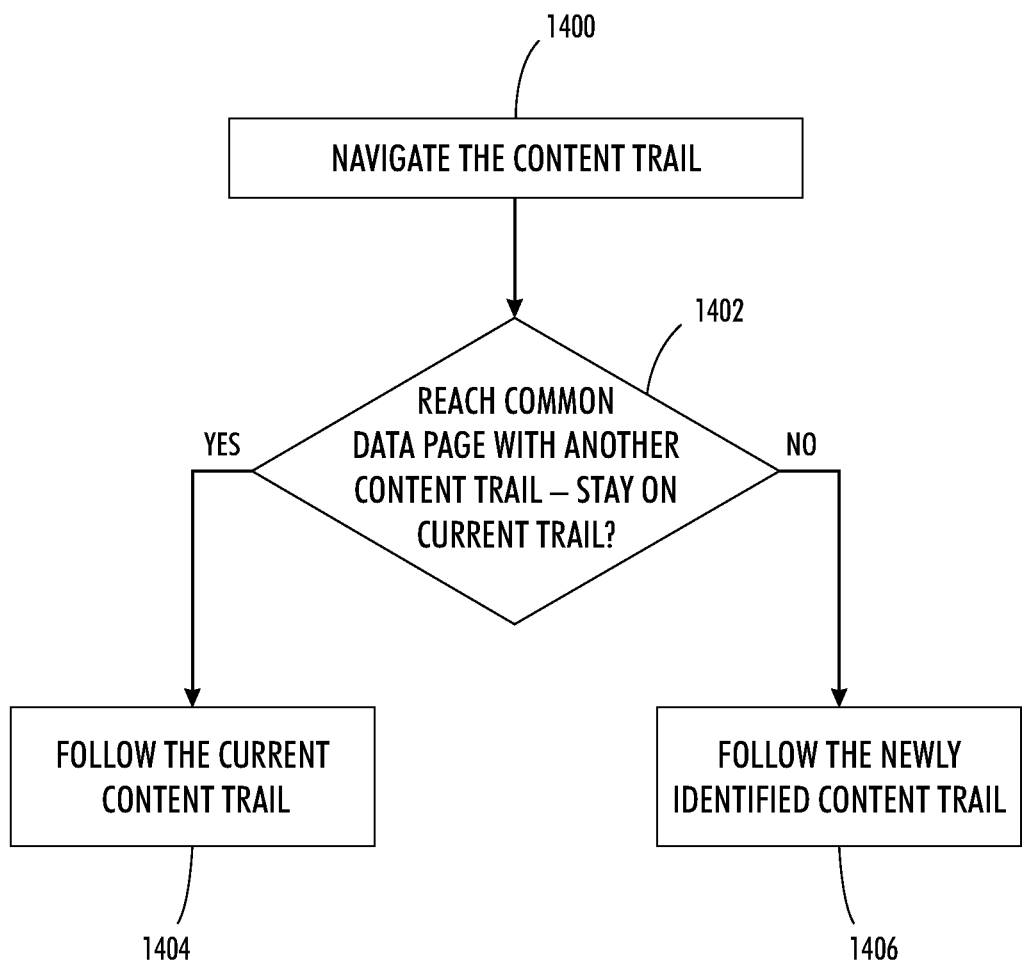
FIG. 14 is a flowchart illustrating a process of navigating content trails.

FIG. 14 is a flowchart illustrating a process of navigating content trails. Viewers of the content trail can navigate the content trail following the paths defined by the content trail to view data pages referenced by the content trail (step 1400). The user can select the manner in which the content trail is viewed, such as, for example, using a local view and/or a trail view. When the user reaches data pages referenced on the content trail currently being followed as well as on another content trail (1402), the user can decide to follow the current content trail (1404) or to leave the current content trail and follow the newly identified content trail (1406). At any time the viewer may wish to store a copy of the content trail to be modified by the viewer to create a new content trail for navigation.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for implementing a content trail associated with data pages comprising:
   retrieving, from storage, references to data pages collected from the Internet;
   generating a plurality of content trails for the data pages with a trail generator implemented using one or more computing devices, the content trail being generated using the references to the data pages, each content trail comprising a defined set of the references, the references being organized into a user-defined, ordered sequence in the content trail and being interconnected by user-assigned relationships to define at least one path in the content trail that is navigable;
   navigating a first content trail of the generated plurality of content trails;
   while navigating the first content trail, identifying to the user a second content trail of the plurality of content trails different from the first content trail, the second content trail having common data pages with the first content trail but no user-assigned relationship with the first content trail; and
   prompting a user to navigate away from the first content trail and to the second content trail in response to a user selection of the second content trail responsive to the prompt.

2. The method of claim 1 further comprising collecting data pages in response to an explicit selection by a user.

3. The method of claim 1, wherein generating a content trail comprises:
   depicting the references as graphical reference objects in a graphical user interface; and
   connecting the graphical reference objects with lines to define a relationship between the graphical reference objects in response to an input from the user.

4. The method of claim 1 further comprising at least one of storing the content trail in a repository accessible by Internet users and distributing the content trail to Internet users via a website.

5. The method of claim 1 further comprising modifying the content trail by at least one of removing data pages from the content trail and adding data pages to the content trail.

6. The method of claim 1 further comprising:
   reorganizing the references to the data pages into a different ordered sequence; and
   reconnecting the references to each other in the different ordered sequence to define a different relationship between the data pages.

7. The method of claim 1, further comprising assigning metadata to at least one of the references and relationships in the content trail.

8. The method of claim 1 further comprising combining the content trail with another content trail to form a concatenated content trail.

9. The method of claim 1, wherein the relationships externally interconnect the data pages without modification to an existing link structure within the data pages so that the relationships are not inserted into the data pages.

10. The method of claim 1, further comprising receiving the content trail by a repository containing other content trails generated by a plurality of users, the repository facilitating collaborative development of new content trails.

11. A non-transitory computer readable medium storing instructions executable by a computing system including at least one computing device, wherein execution of the instructions implements a method for generating a content trail associated with data pages comprising:
    retrieving, from storage, references to selected data pages;
    generating a plurality of content trails for the selected data pages with a trail generator implemented using one or more computing devices, the content trail being generated using references to the data pages, each content trail comprising a defined set of the references, the references being organized into a user-defined, ordered sequence in the content trail and being interconnected by user-assigned relationships to define at least one path in the content trail that is navigable;
    navigating a first content trail of the generated plurality of content trails;
    while navigating the first content trail, identifying to the use a second content trail of the plurality of content trails different from the first content trail, the second content trail having common data pages with the first content trail but no user-assigned relationship with the first content trail; and
    prompting a user to navigate away from the first content trail and to the second content trail in response to a user selection of the second content trail responsive to the prompt.

12. The non-transitory computer readable medium of claim 11, wherein generating a content trail comprises:
    depicting the references as graphical reference objects in a graphical user interface; and
    connecting the graphical reference objects with lines to define a relationship between the graphical reference objects in response to an input from the user.

13. The non-transitory computer readable medium of claim 11 further comprising at least one of storing the content trail in a repository accessible by Internet users and distributing the content trail to Internet users via a website.

14. The non-transitory computer readable medium of claim 11 further comprising:
    reorganizing the references to the data pages into a different ordered sequence; and
    reconnecting the references to each other in the different ordered sequence to define a different relationship between the data pages.

15. The non-transitory computer readable medium of claim 11, wherein the relationships externally interconnect the data pages without modification to an existing link structure within the data pages so that the relationships are not inserted into the data pages.

16. A system for generating a content trail comprising:
    a computer system including at least one computing device, the computing system configured with a trail generator to retrieve, from storage, references to data pages selected from the Internet and generate a plurality of content trails using the references to data pages selected from the Internet, each content tail comprising a defined set of the references, the references being organized into one of a plurality of user-defined, ordered sequences in the content trails and being interconnected by user-assigned relationships to define at least one path in the content trails that is navigable, the computing system further configure to navigate a first content trail of the generated plurality of content trails and while navigating the first content trail identify to a user a second content trail having common data pages with the first content tail but no user-assigned relationship with each other, the computing system further configured to prompt the user to navigate away from the first content trail and to the second content trail in response to a user selection of the second content trail responsive to the prompt.

17. The system of claim 16, wherein the computer system is configured to distribute the content trail to Internet users via a website.

18. The system of claim 16, wherein the computing system is configured to reorganize the references to the data pages into a different ordered sequence and reconnect the references to each other in the different ordered sequence to define a different relationship between the data pages in response to receiving input from a user.

19. The system of claim 16, wherein the computing system is configured to externally interconnect the data pages based on the relationships without modification to an existing link structure within the data pages so that the relationships are not inserted into the data pages.

20. A system for managing content trails comprising:
a storage device implemented as a repository operative to receive and store content trails generated by a plurality of users, the content trails being generated using references to data pages collected by the users, each of the content trails comprising a defined set of the references including at least two of the references, wherein the at least two of the references of each of the content trails are organized into user-defined, ordered sequences and are interconnected by user-assigned relationships to define at least one path in the content trails that is navigable; and
a computing device implemented as a server operative to interface with the repository to facilitate access to the content trails, and configured to determine which of the content trails have at least one of the data pages in common based on the references included in the content trails but no user-assigned relationship with the first content trail, to facilitate navigation from one of the content trails to a different one of the content trails stored in the repository based on the at least one of the data pages in common, the computing device further operative to prompt a user to navigate away from the first content trail and to the second content trail in response to a user selection of the second content trail responsive to the prompts.

21. A method of managing content trails comprising:
receiving a plurality of content trails from a plurality of users by a shared repository, the shared repository receiving the content trails via a plug-in used by the plurality of users to generated the content trails;
storing content trails created by the plurality of users in the shared repository, the content trails being generated using references to data pages collected by the users, each of the content trails comprising a defined set of the references, including at least two of the references, the at least two of the references of each of the content trails being organized into user-defined, ordered sequences in the content trails and being interconnected by user-assigned relationships to define at least one path in the content trails that is navigable;
determining which of the content trails have at least one of the data pages in common based on the references included in the content trails but no user-assigned relationship with the first content trail, using a server to facilitate navigation from a first one of the content trails to a second one of the content trails stored in the repository based on the at least one of the data pages in common;
navigating the first one of the generated content trails to the at least one of the data pages in common between the first one the content trails and the second one of the content trails; and
prompting a user to navigate away from the first one of the content trails and to the second one of the content trails stored in the repository in response to a user selection of the second one of the content trails responsive to the prompt when the at least one of the data pages in common is displayed.

22. The method of claim 21, further comprising:
retrieving a first one of the content trails for a first user, the first one of the content trail being generated by a second user;
receiving a modification of the first one of the content trails to form a modified content trail; and
storing the modified content trail in the repository.

23. A non-transitory computer readable medium storing instructions executable by a computing system including at least one computing device, wherein execution of the instructions facilitates managing content trails comprising:
receiving a plurality of content trails from a plurality of users by a shared repository, the shared repository receiving the content trails via a plug-in used by the plurality of users to generated the content trails;
storing content trails created by the plurality of users in the shared repository, the content trails being generated using references to data pages collected by the users, each of the content trails comprising a defined set of the references, including at least two of the references, the at least two of the references of each of the content trails being organized into user-defined, ordered sequences in the content trails and being interconnected by user-assigned relationships to define at least one path in the content trails that is navigable;
determining which of the content trails have at least one of the data pages in common based on the references included in the content trails but no user-assigned relationship with the first content trail, using a server to facilitate navigation from a first one of the content trails to a second one of the content trails stored in the repository based on the at least one of the data pages in common;
navigating the first one of the generated content trails to the at least one of the data pages in common between the first one the content trails and the second one of the content trails; and
prompting a user to navigate away from the first one of content trails and to the second one of the content trails stored in the repository in response to a user selection of the second one of the content trails responsive to the prompt when the at least one of the data pages in common is displayed.

* * * * *